(12) United States Patent
Boxwell et al.

(10) Patent No.: US 11,295,077 B2
(45) Date of Patent: Apr. 5, 2022

(54) STRATIFICATION OF TOKEN TYPES FOR DOMAIN-ADAPTABLE QUESTION ANSWERING SYSTEMS

(71) Applicant: International Business Machines Corporation, Armonk, NY (US)

(72) Inventors: Stephen A. Boxwell, Columbus, OH (US); Keith G. Frost, Delaware, OH (US); Kyle M. Brake, Dublin, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 16/377,779

(22) Filed: Apr. 8, 2019

(65) Prior Publication Data
US 2020/0320169 A1    Oct. 8, 2020

(51) Int. Cl.
| | | |
|---|---|---|
| *G10L 15/26* | (2006.01) | |
| *G06N 5/04* | (2006.01) | |
| *G06F 40/205* | (2020.01) | |
| *G06N 20/00* | (2019.01) | |
| *G06N 3/08* | (2006.01) | |
| *G06F 40/284* | (2020.01) | |
| *G06F 40/289* | (2020.01) | |

(52) U.S. Cl.
CPC .......... *G06F 40/205* (2020.01); *G06F 40/284* (2020.01); *G06F 40/289* (2020.01); *G06N 3/084* (2013.01); *G06N 20/00* (2019.01)

(58) Field of Classification Search
None
See application file for complete search history.

(56) References Cited

U.S. PATENT DOCUMENTS

| | | |
|---|---|---|
| 8,935,277 B2 | 1/2015 | Kuchmann-Beauger et al. |
| 9,904,667 B2 | 2/2018 | Kalyanpur et al. |

(Continued)

FOREIGN PATENT DOCUMENTS

| | | |
|---|---|---|
| WO | 2014000764 A1 | 1/2014 |

OTHER PUBLICATIONS

Zhou et al., "Learning semantic representation with neural networks for community question answering retrieval", Knowledge-Based Systems 93 (2016): pp. 75-83. (Year: 2016).*

(Continued)

*Primary Examiner* — Seong-Ah A Shin
(74) *Attorney, Agent, or Firm* — Law Office of Jim Boice

(57) ABSTRACT

A method determines a relevancy of answers to questions based on token relevance in a system capable of answering questions. One or more processors receive a question that is composed of a set of tokens T (T1, T2, . . . , Tn). The processor(s) select tokens T' (T'1, T'2, . . . , T'm) from the tokens T (T1, T2, . . . , Tn), where each T'j from T' is a noun, and classify each T'j as a noun type. The processor(s) scan a corpus to identify passages with candidate answers to the question, and analyze the identified passages utilizing noun entries in the passages classified as the noun type. The processor(s) train an artificial intelligence (AI) system to associate a relevancy to the question for the identified passages based on noun types, and then utilize the trained AI system to provide an answer to the question based on an output of the trained AI system.

19 Claims, 8 Drawing Sheets

(56) References Cited

U.S. PATENT DOCUMENTS

| | | | |
|---|---|---|---|
| 10,170,107 B1* | 1/2019 | Dreyer | G10L 15/26 |
| 10,839,159 B2* | 11/2020 | Yang | G06N 5/022 |
| 2017/0075935 A1* | 3/2017 | Lagos | G06N 5/022 |
| 2018/0052929 A1* | 2/2018 | Liu | G06F 16/951 |
| 2018/0082187 A1 | 3/2018 | Katz et al. | |
| 2018/0189385 A1* | 7/2018 | Sun | G06F 16/24578 |
| 2018/0246953 A1* | 8/2018 | Oh | G06N 5/003 |
| 2018/0341871 A1* | 11/2018 | Maitra | G06N 3/0427 |
| 2019/0103092 A1* | 4/2019 | Rusak | G06F 40/35 |
| 2019/0122145 A1* | 4/2019 | Sun | G06F 40/295 |
| 2019/0236464 A1* | 8/2019 | Feinson | G06N 5/04 |
| 2020/0089768 A1* | 3/2020 | Kim | G06N 5/04 |
| 2020/0134263 A1* | 4/2020 | Oh | G06N 3/082 |

OTHER PUBLICATIONS

Verberne et al., "What is not in the Bag of Words for Why-QA?", Computational Linguistics, 36(2), 229-245. (Year: 2010).*

Oh et al., "Multi-column convolutional neural networks with causality-attention for why-question answering." Proceedings of the Tenth ACM International Conference on Web Search and Data Mining. 2017. (Year: 2017).*

P. Mell et al., "The NIST Definition of Cloud Computing", National Institute of Standards and Technology, Information Technology Laboratory, Sep. 2011, pp. 1-7.

D. Buscaldi et al., "Answering Questions With an N-Gram Based Passage Retrieval Engine", Journal of Intelligent Information Systems 34.2: 113-134, Sprinter Science & Business Media, Apr. 2010.

F. Li et al., "Classifying What-Type Questions By Head Noun Tagging", Proceedings of the 22nd International Conference On Computational Linguistics, Manchester, Aug. 2008, pp. 481-488.

* cited by examiner

GUI 200

THE FLIGHT CEILING OF A 747 IS HOW MANY FEET? ⟋202

IN WHAT FILM DOES ACTOR A STAR IN A STORY THAT TAKES PLACE INSIDE A 747? ⟋204

WHAT AMERICAN PRESIDENT VISITED BERLIN IN 1987? ⟋206

WHAT IS THE INTERIOR TEMPERATURE OF THE PRESSURIZED VESSEL TODAY? ⟋208

STRATIFICATION OF TOKEN TYPES FOR DOMAIN-ADAPTABLE QUESTION ANSWERING SYSTEMS

BACKGROUND

The present invention relates to the field of question answering systems. Still more specifically, the present invention relates to the field of question answering systems that determine a relevancy of answers to questions based on token relevance.

SUMMARY

In an embodiment of the present invention, a method determines a relevancy of answers to questions based on token relevance in a system capable of answering questions. One or more processors receive a question that is composed of a set of tokens T (T1, T2, ..., Tn). The processor(s) select tokens T' (T'1, T'2, ..., T'm) from the tokens T (T1, T2, ..., Tn), where each T'j from T' is a noun, and classify each T'j as a noun type. The processor(s) scan a corpus to identify passages with candidate answers to the question, and analyze the identified passages utilizing noun entries in the passages classified as the noun type. The processor(s) train an artificial intelligence (AI) system to associate a relevancy to the question for the identified passages based on noun types, and then utilize the trained AI system to associate the relevancy to the question for the identified passages, in order to provide an answer to the question based on an output of the trained AI system.

In an embodiment of the present invention, the processor(s) modify a hardware device based on the answer that is identified by a neural network.

In one or more embodiments, the method(s) described herein are performed by an execution of a computer program product and/or a computer system.

BRIEF DESCRIPTION OF THE DRAWINGS

FIG. 2 illustrates a graphical user interface used in one or more embodiments of the present invention;

DETAILED DESCRIPTION

Figure 1:
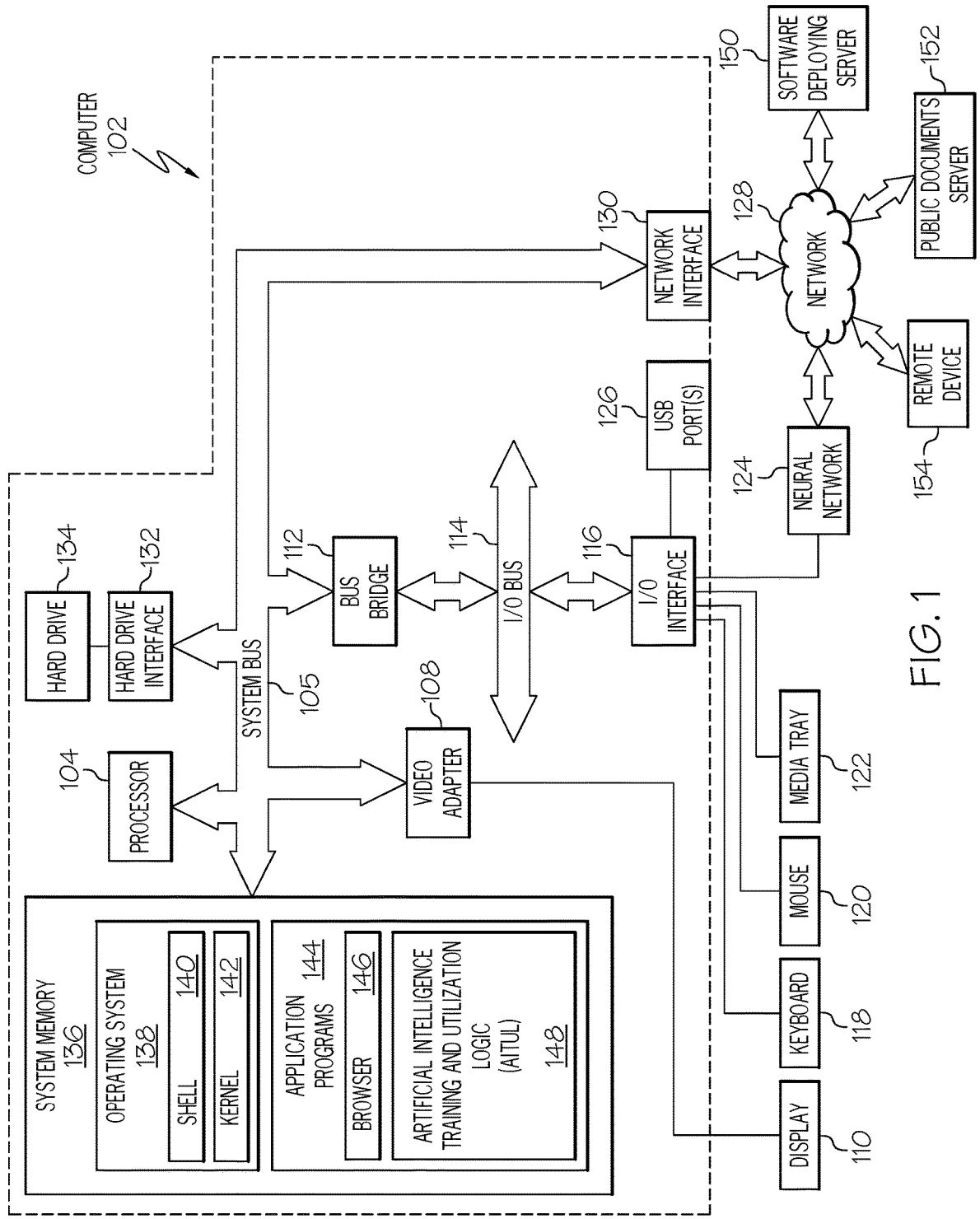
FIG. 1 depicts an exemplary system and network in which the present invention may be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA)

execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device to implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or public documents server 152 and/or remote device 154 and/or neural network 124.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a neural network 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or the public document server 152 and/or the remote device 154 and/or the neural network 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Artificial Intelligence Training and Utilization Logic (AITUL) 148. AITUL 148 includes code for implementing the processes described below, including those described in FIGS. 2-6. In one embodiment, computer 102 is able to download AITUL 148 from software deploying server 150, including in an on-demand basis, wherein the code in AITUL 148 is not downloaded until needed for execution. Note further that, in one embodiment of the present invention, software deploying server 150 performs all of the functions associated with the present invention (including execution of AITUL 148), thus freeing computer 102 from having to use its own internal computing resources to execute AITUL 148.

Also connected to (or alternatively, as part of) computer 102 is a neural network 124. In exemplary embodiments of the present invention, neural network 124 is a deep neural network (see FIGS. 4-5), a convolutional neural network, or another type of heuristic artificial intelligence.

Also connected to computer 102 is a public document server 152, which serves documents that are available to the public. Examples of documents that are served by public document server 152 include, but are not limited to, public forum messages, social media messages, academic paper repositories, news reports generated by the mass media (e.g., newspapers, magazines, electronic news services, etc.), etc.

Also connected to computer 102 is a remote device 154. One or more examples of remote device 154 are presented in FIG. 3.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

In the question answering task, consider the following question from the aviation domain, as entered into query block 202 in the graphical user interface (GUI) 200 shown in FIG. 2:

"The flight ceiling of the 747 is how many feet?"

In this question, the critical piece of information (747) must appear in a candidate answer passage (either in the passage text near the candidate answer, or in some piece of metadata such as the title of the document) for the system to be confident in the accuracy of an answer. That is, an answer such as "The flight ceiling of the 747 is 45,000 feet" is deemed to be an answer that clearly answers the question "The flight ceiling of the 747 is how many feet?" since it includes "747", and thus is likely to be related to aviation.

Unfortunately, passages such as "The flight ceiling of the Airbus 310 is 41,000 feet" will fit the question closely, because almost all of the vocabulary and grammar matches. A human reader can trivially tell that this passage is not at all relevant to the question ("The flight ceiling of the 747 is how many feet?") because the most important piece of information ("747") is not present. However, a computer has difficulty in discerning a difference between the two passages "The flight ceiling of the 747 is 45,000 feet" and "The flight ceiling of the Airbus 310 is 41,000 feet".

In another domain, however, the exact model of an airplane might be less relevant. Consider this question from the film and entertainment domain entered in query block 204 in GUI 200 in FIG. 2:

"In what film does Actor A star in a story that takes place inside a 747?"

In this domain, the exact detail of the plane model is less relevant. Rather, information such as the name of the lead actor ("Actor A") is likely to be more relevant and useful for distinguishing between candidate answers.

As such, one or more embodiments of the present invention present a system for rapidly and easily adapting a question-answering system to new domains by generating features corresponding to entities found in questions and the context of candidate answers. The system learns which types of tokens (e.g., words in the question) are most relevant to the question domain using labeled question-answer pairs and represents the relative importance of these types to a machine learning component to accurately represent their relative importance to the domain.

For example, assume that a user has entered the following question into query block 206 in FIG. 200 in FIG. 2:

What American president visited Berlin in 1987?

Figure 4:
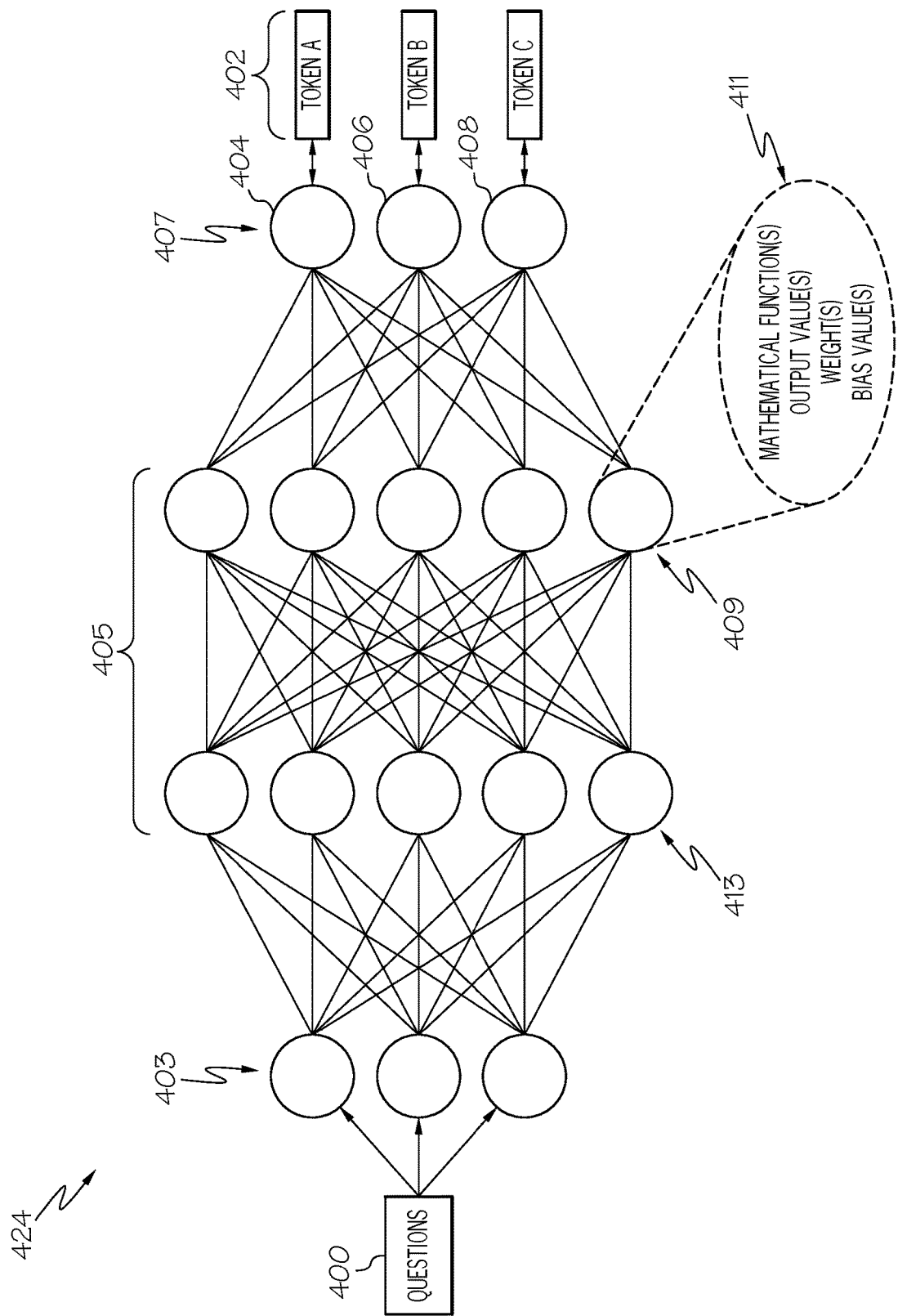
FIG. 4 depicts an exemplary deep neural network as used in one or more embodiments of the present invention.

Assume further that the system (e.g., an artificial intelligence system such as the deep neural network (DNN) 424 shown in FIG. 4) has been configured to make use of three word (token) types: "country", "city", and "year". In this case, the question contains entities of three basic types: "America" (country), "Berlin" (city), and "1987" (year). Each of these word/token types and the entities corresponding to them are noted. The relevant types are:

[
country --> {"America"},
city --> {"Berlin"},
year --> {"1987"}
]

Now, assume that the system has retrieved the following passages from a corpus of documents:

In 1987, President R gave his "Tear Down This Wall" speech to gathered spectators in Germany.

President C, on his way to visit the Russian president in Moscow, stopped over briefly in Berlin.

In 1776, Person W secretly traveled from America to Berlin secretly in a veritable miracle of transportation and logistics.

Suppose further that each of these passages are used to generate a candidate answer to the question "What American president visited Berlin in 1987?": "President R", "President C", and "Person W".

For the "President R" passage/candidate answer, the token "1987" appears, but "Berlin" and "America" do not.

For the "President C" passage/candidate answer, the token "Berlin" appears, but "1987" and "America" do not.

For the "Person W" passage/candidate answer, the token "America" appears, but "1987" and "Berlin" do not.

At this point, the system does not know which of these inclusions or omissions are meaningful for this domain (history) and the corpus (of possible answers).

As such, the "President R" candidate answer is assigned values to the features:

TYPE_YEAR=1.0
TYPE_CITY=0.0
TYPE_COUNTRY=0.0

The "President C" candidate answer is assigned values to the features:
TYPE_YEAR=0.0
TYPE_CITY=1.0
TYPE_COUNTRY=0.0

The "Person W" candidate answer is assigned values to the features:
TYPE_YEAR=0.0
TYPE_CITY=0.0
TYPE_COUNTRY=1.0

This process is then repeated for every QA pair in the training set, and on every question/passage/candidate at runtime. By exposing these features to the answer scoring machine learning algorithm, the system learns which types are most predictive and which types are least predictive for the target domain specified by the training QA pairs and the corpus. This learning is manually performed by a user in one embodiment, in which the user looks at each answer to see which one makes the most sense. In another embodiment, the learning is machine based, in which another machine learning algorithm examines scores provided by users, systems, etc., which rate the various answers according to their usefulness, accuracy, etc.

An exemplary algorithm/pseudocode for training the system is:

```
let RESULT be an empty list
let A be an empty set of tokens
for each input question q:
-- for each token t in q:
---- if t is a noun, then add t to A
let M be an empty map from types to sets of words
for each token a in A:
-- get the types Z of a
-- for each type z in Z:
---- add a to the set of words in M corresponding to type z, creating one if it doesn't already exist
for each input question/passages pair q/P:
-- let R be an empty set of tokens
-- for each passage p in P:
---- for each token c in p:
------if c is a noun, add c to R
-- for each type t in M:
---- add all tokens of R to a new set E
---- remove all words in M corresponding to t from E
---- let x be the size of M divided by the size of t.
---- add x to RESULT.
```

With reference again to FIG. 2, assume that a user entered the following question (for the corpus "chemical refining") into input block 208 in the GUI 200:

"What is the interior temperature of the pressurized vessel today?"

As indicated by the underlining, there are three nouns in this question: "temperature"; "vessel"; and "today". Assume that the corpus contained a passage for a temperature of 98.6° F. today. However, if the system returned a "temperature" of "98.6", there is a strong likelihood that this is for a person (patient), not a pressure vessel ("pressurized vessel"), such as found in a chemical refinery. As such, the system would learn that "temperature" is not a reliable token/noun to search for in the corpus. Furthermore, "today" is too broad (returns answers for too many disparate domains), and thus is also not a useful token/noun to search for in the corpus. Thus, the most reliable/useful token/noun to search for in the corpus (in order to answer the question "What is the interior temperature of the pressurized vessel today") is discovered by the artificial intelligence to be "vessel", even though this may return passages that refer to boats, etc.

Nonetheless, the artificial intelligence (AI) system will, after being properly trained, learn what the most significant token/noun in the question is, in order to align that token/noun with passages from a corpus (e.g., of documents), in order to arrive at the answer to the question for the domain of chemical refining (in which pressure vessels are used). In one or more embodiments of the present invention, this leads to the automatic control of one or more physical devices.

That is, in the example of the question about the pressure/pressurized vessel, once the corpus is searched by the AI system to find the answer to the question, this answer is used to control one or more devices based on the found answer.

Figure 3:
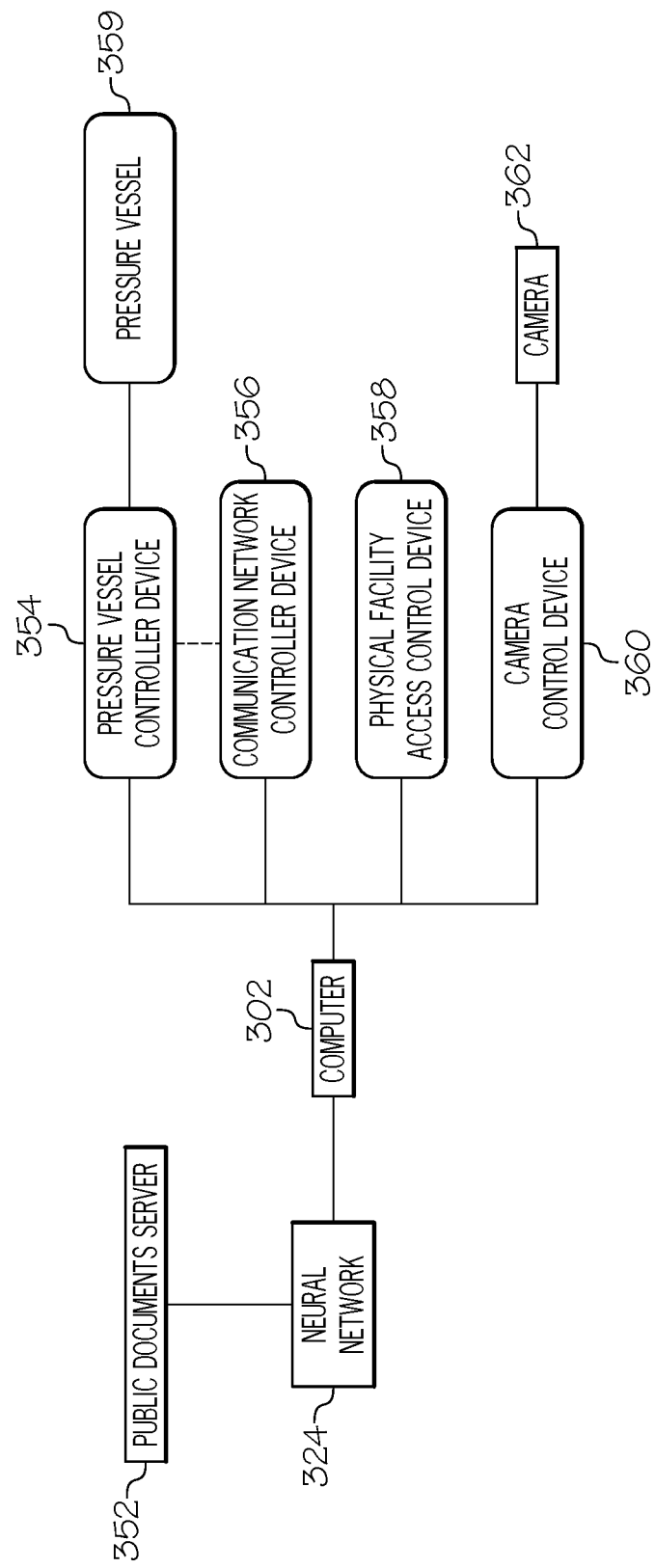
FIG. 3 depicts a connective relationship between a controlling computer and one or more control devices used in one or more embodiments of the present invention.

For example, and as shown in FIG. 3, assume that computer 302 (analogous to computer 102 shown in FIG. 1) and/or neural network 324 (analogous to neural network 124 shown in FIG. 1 and/or trained deep neural network 524 shown in FIG. 5) have determined that a correct answer from the public documents server 352 (which serves a corpus of documents and/or other information) describes a temperature for the pressure vessel 359 that is anomalous. For example, assume that the nominal operating temperature of pressure vessel 359 is 50° F., but a document in the corpus (e.g., a report typed in by an operator in a refinery) states that the current temperature of this pressure vessel 359 is 98.6° F. As this is well outside of nominal operating temperatures, various actions are taken for various devices.

For example, and in an embodiment of the present invention, the computer 302 directs a pressure vessel controller device 354 (analogous to remote device 154 shown in FIG. 1) to take steps for lowering the internal temperature of the pressure vessel 359. In various embodiments of the present invention, the pressure vessel controller device 354 controls feedstock to the pressure vessel 359 by opening and closing valves in pipelines leading to the pressure vessel 359, thus reducing the amount of exothermic reactions within the pressure vessel 359, lowering the volumetric pressure from feedstock within the pressure vessel 359 (thus lowering the pressure-based temperature inside the pressure vessel 359), reduces the level of reactions within pressure vessel 359, provides additional coolant to the pressure vessel 359, etc.

In an embodiment of the present invention, assume that a communication network controller device 356 (also analogous to remote device 154 shown in FIG. 1) controls a communication network (e.g., network 128 shown in FIG. 1, but not shown in FIG. 3) between computer 302 and pressure vessel controller device 354. That is, in order for remote instructions to be sent from computer 302 to pressure vessel controller device 354, communication network controller device 356 activates the network between the computer 302 and the pressure vessel controller device 354 in response to the computer 302 receiving a document indicating that the internal temperature of the pressure vessel 359 is above a predetermined temperature, and in response to the computer 302 sending a communication network activation signal to the communication network controller device 356. This allows the computer 302 to remotely direct the pressure vessel controller device 354 to take steps to reduce the internal temperature of the pressure vessel 359 (e.g., reducing feedstock levels to the pressure vessel 359, dousing the pressure vessel 359 with cooling water from a water supply—not shown in FIG. 3, etc.)

In an embodiment of the present invention, assume that a physical facility access control device 358 (also analogous to remote device 154 shown in FIG. 1) controls locks on doors, movable bollards, barricades, gates, etc. that control access to the pressure vessel 359. Thus, if the reported temperature is high enough to potentially cause a catastrophic failure of the pressure vessel 369, then access to the pressure vessel 359 is opened (if enough time is available to safely take care of the problem) or closed (if failure is imminent), thus protecting workers in the area.

In an embodiment of the present invention, assume that a camera control device 360 (also analogous to remote device 154 shown in FIG. 1) controls a camera 362 that is able to visually monitor the pressure vessel 359. Thus, if the reported temperature is high enough to warrant visual monitoring by computer 302 (and/or a user of computer 302), then computer 302 sends a camera activation signal to camera control device 360 to activate camera 362, thus resulting in real-time video/photos being sent to computer 302.

In one or more embodiments, the present invention uses an electronic neural network, such as the neural network 124 shown in FIG. 1, to identify a passage that answers a particular question, whose answer can be used to control a particular device, provide information to a user, etc.

In various embodiments of the present invention, the neural network 124 shown in FIG. 1 is a Deep Neural Network (DNN), a Convolutional Neural Network (CNN), and/or another type of machine learning system. In a preferred embodiment, a DNN is used to evaluate text/numeric corpuses looking for an answer to a question, while a CNN is used to evaluate image corpuses that can answer a particular question.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a DNN, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

Figure 5:
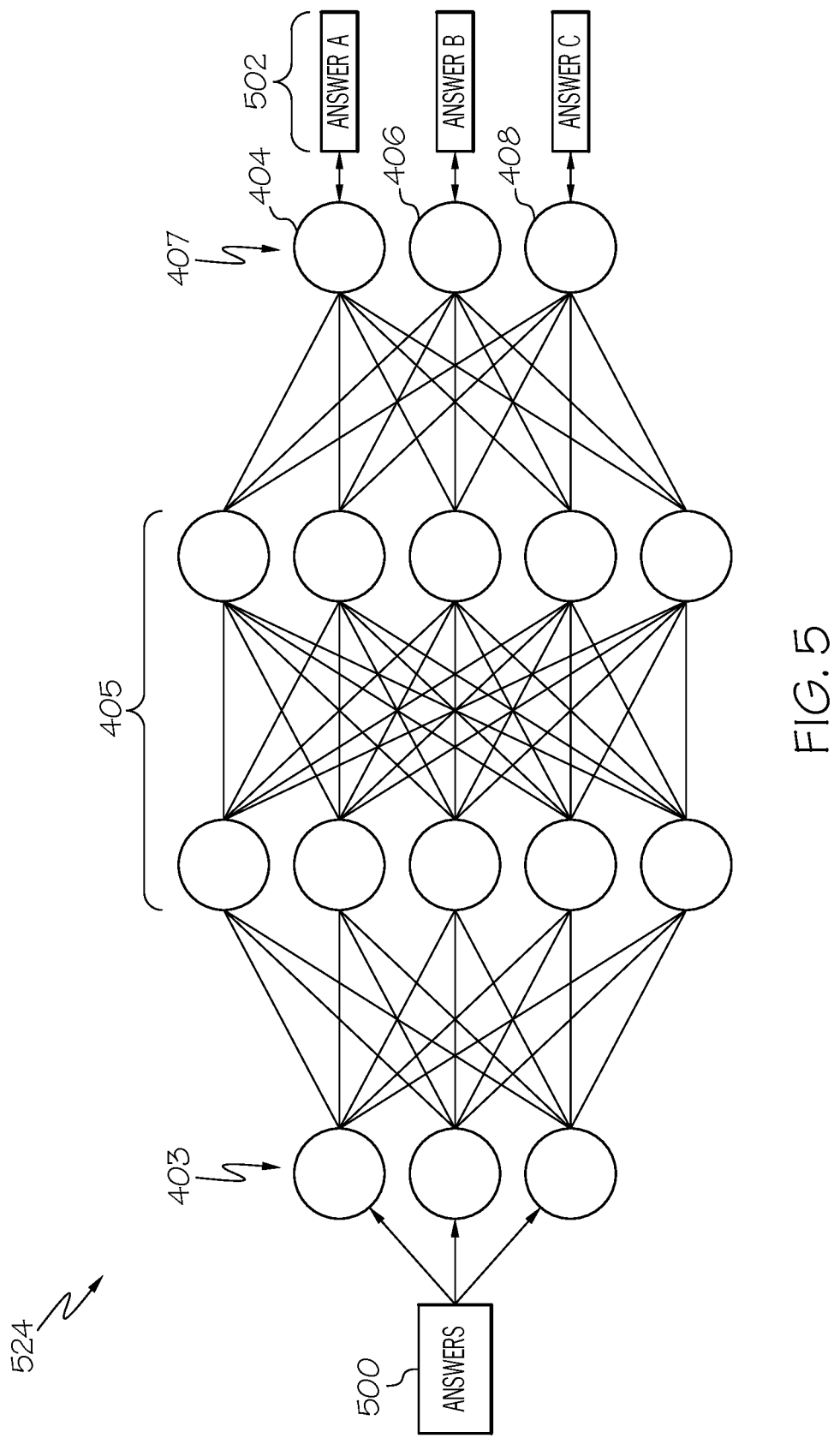
FIG. 5 illustrates an exemplary trained deep neural network as used in one or more embodiments of the present invention.

With reference now to FIG. 4, a Deep Neural Network (DNN) 424 used to evaluate textual data in one or more embodiments of the present invention is presented. FIG. 4 depicts DNN 424 being trained to understand a domain of a question, and FIG. 5 depicts DNN 424 being used to search a corpus in order to find an answer to a particular question from the trained DNN 524.

For example, and with reference to FIG. 4, assume, for illustrative purposes, that questions 400 are questions that ask various forms of the question "What temperature is the interior temperature of the pressurized vessel today?" from the domain of chemical refining. Such variations could include questions such as "What in the internal temperature of the pressure vessel now?"; "How hot is the pressurized vessel?"; "What is the current temperature of the pressurized vessel?"; "What is the internal temperature in the tank today?"; etc. As such, some of the questions 400 include the token "temperature" but not "vessel" or "today"; some of the questions 400 include the token "temperature" of "today" but not "vessel", and some of the questions 400 include the token "vessel" but not "temperature" or "today". As such, since a determination has been made that Token A (e.g., that describes the noun "vessel") is the most useful (e.g., based on a track record of what noun token is the most useful when looking for an answer to a particular type of question), then DNN 424 is trained to give Token A ("vessel") the highest value when evaluating questions 400. DNN 424 is trained to give Token B ("temperature") a lower value when evaluating questions 400. DNN 424 is trained to give Token C ("today") an even lower value when evaluating questions 400.

As shown in FIG. 4, the electronic neurons in DNN 424 are arranged in layers, known as an input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information. In an embodiment of the present invention, each neuron in the output layer 407 is associated with a particular event label from event labels 402, as shown in FIG. 4.

As just mentioned, each node in the depicted DNN 424 represents an electronic neuron, such as the depicted neuron 409. As shown in block 411, each neuron (including neuron 409) includes at least four features: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the DNN 424 to be further "fine tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the DNN 424, such that a reliable output will result from output layer 407. Such adjustments are alternatively performed manually or automatically.

When manually adjusted, the weights and/or biases are adjusted by the user in a repeated manner until the output from output layer 407 matches expectations. For example, assume that input layer 403 receives inputs from Questions 400 that ask for information about a "vessel", "temperature", and "today". If DNN 424 has been properly trained (by manually adjusting the mathematical function(s), output value(s), weight(s), and biases in one or more of the electronic neurons within DNN 424) to output a correct output vector (e.g., a 3-tuple output vector of 0.9, 0.2, and 0.1) to the output layer 407, then the neuron 404 for Token A (e.g., "vessel") has the highest value (0.9). Furthermore, the DNN 424, when properly trained, gives a value of 0.2 to neuron 406, indicating that Token B (e.g., "temperature") is an insignificant token label for these types of questions 400. Furthermore, the DNN 424, when properly trained, gives a value of 0.1 to neuron 408, indicating that Token C (e.g., "today") is an insignificant token label for these types of questions 400.

When automatically adjusted, the weights (and/or mathematical functions) are adjusted using "back propagation", in which weight values of the neurons are adjusted by using a "gradient descent" method that determines which direction each weight value should be adjusted to. For example, if the output from neuron 404 is just 0.5 and the output from neuron 406 is also 0.5, but the output from the neuron 404 (which is associated with Token A, such as "vessel") should be higher than any other neuron from the output layer 407, then the output from neuron 404 is manually changed to a high value (e.g., 0.9) and the output of neuron 406 is changed to 0.2 or smaller, and the output of neuron 408 is changed to 0.1 or smaller. The back propagation gradient descent process moves the weight and/or bias in each neuron in a certain direction until the output from output layer 407 improves (e.g., gets closer to outputting a highest value to neuron 404, thus indicating that the Token A is the most useful type of token to use when evaluating questions 400 and finding their answers from a corpus).

With reference now to FIG. 5, assume that DNN 424 has been trained as described in FIG. 4, and is now a trained DNN 524. Thus, when answers 500 from a corpus source (e.g., public documents server 352 shown in FIG. 3) are input into trained DNN 524, the document that best fits (i.e., has the highest rating) the trained DNN 524 (e.g., that uses the term "vessel" in the document) will be output as Answer A in the answer labels 502. Answer B (that uses the term "temperature") has a lower answer rating value, and Answer C (that uses the term "today") has an even lower answer rating value.

Figure 6:
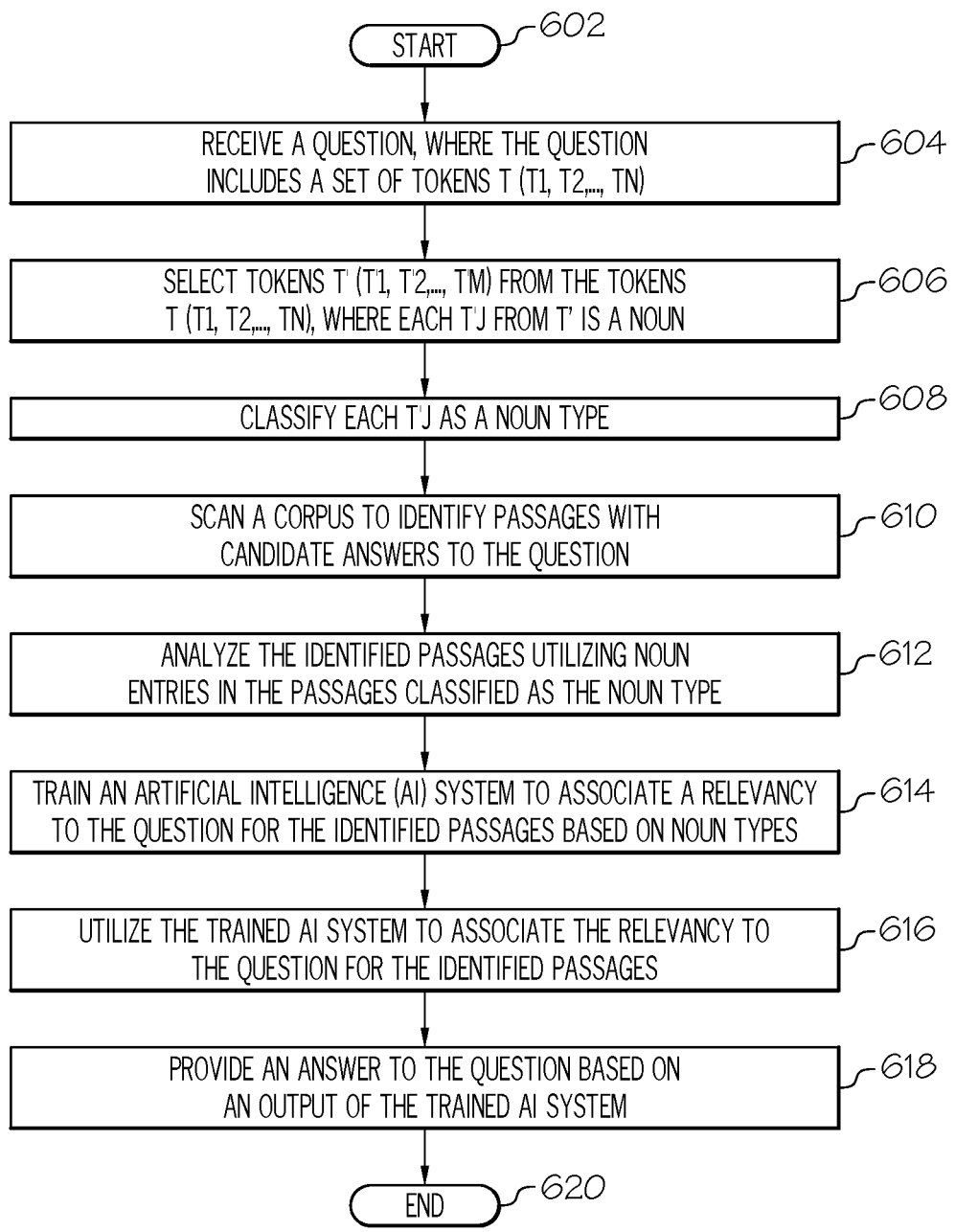
FIG. 6 is a high-level flow chart of one or more steps performed in accordance with one or more embodiments of the present invention.

With reference now to FIG. 6, a high-level flow chart of one or more embodiments of the present invention is presented.

After initiator block 602, one or more processors (e.g., processor 104 shown in FIG. 1) receive a question (e.g., one or more of the questions 400 shown in FIG. 4), as described in block 604. Each question includes a set of tokens T (T1, T2, ..., Tn), such as words, phrases, etc.

As described in block 606, the processor(s) select tokens T' (T'1, T'2, ..., T'm) from the tokens T (T1, T2, ..., Tn), where each T'j from T' is a noun. For example, assume that tokens T are the words "What temperature is in the pressurized vessel today". As such, the tokens T' that are nouns are "temperature", "vessel", and "today".

As described in block 608, the processor(s) classify each T'j as a noun type. For example, "temperature" is classified as a physical state descriptor; "vessel" is described as a container descriptor; and "today" is classified as a time descriptor.

As described in block 610, the processor(s) scan a corpus (e.g., a set of candidate answers from a corpus source, such as public documents server 352 shown in FIG. 3) to identify passages with candidate answers to the question.

As described in block 612, the processor(s) analyze the identified passages (from the corpus) utilizing noun entries in the passages classified as the noun type. For example, noun types such as a physical state descriptor, a container descriptor, and a time descriptor are analyzed.

As described in block 614, the processor(s) train an artificial intelligence (AI) system to associate a relevancy to the question for the identified passages based on noun types, as described in FIG. 4.

As described in block 616, the processor(s) utilize the trained AI system to associate the relevancy to the question for the identified passages, as described in FIG. 5.

As described in block 618, the processor(s) then provide an answer to the question based on an output of the trained AI system. For example, if answers 500 run through trained DNN 524 determine that the highest rated Answer A (e.g., 98.6° F.) is for a vessel, then 98.6° F. is used to populate answer box 210 in FIG. 2.

The flow chart ends at terminator block 620.

As described in FIG. 5 and in an embodiment of the present invention, the processor(s) train the AI system to learn which of the noun types are most predictive and which of the noun types are least predictive for associating the relevancy to the question for the identified passages from the corpus. That is, once the trained DNN 524 is trained to use a certain noun/token to find an appropriate answer, the Answers A-C are evaluated to determine how accurate they are. If in fact Answer A (which used the term "vessel") is the most accurate and useful answer to the question having a same or similar construction as the question "What temperature is in the pressurized vessel today?", then the trained DNN 524 learns that the noun type of container description is determined to be the most useful noun type for answering this type of question.

As described herein, in an embodiment of the present invention, at least one of the set of tokens T is a word (e.g., "vessel").

In an embodiment of the present invention, at least one of the set of tokens T is a phrase (e.g., "pressure vessel").

In an embodiment of the present invention, and as described in FIG. 3, the processor(s) utilize the answer to the question to automatically control a physical device.

In an embodiment of the present invention, and as described in FIG. 5, the trained AI system is a trained deep neural network (DNN).

Thus, as described herein, one or more embodiments of the present invention provide a method for stratification of token types for domain-adaptable answering systems. That is, token types (i.e., descriptors of nouns in a question and correlated answers) are arranged in different groups (stratification), such that a correlation is established for an answering system that is adapted to utilize certain domains (various types of fields, such as those described herein, including but not limited to aviation, history, chemical refining, etc.).

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
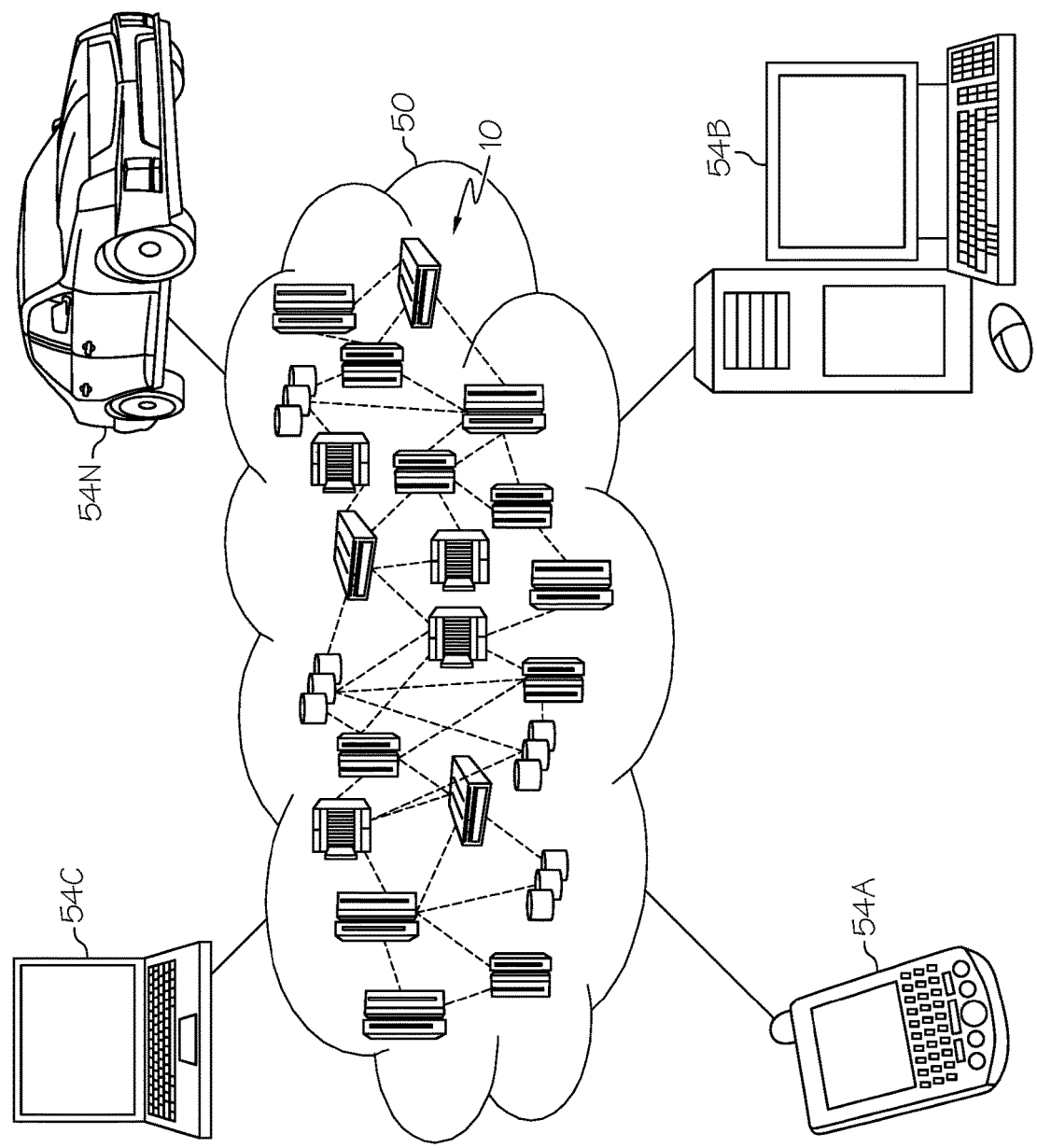
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
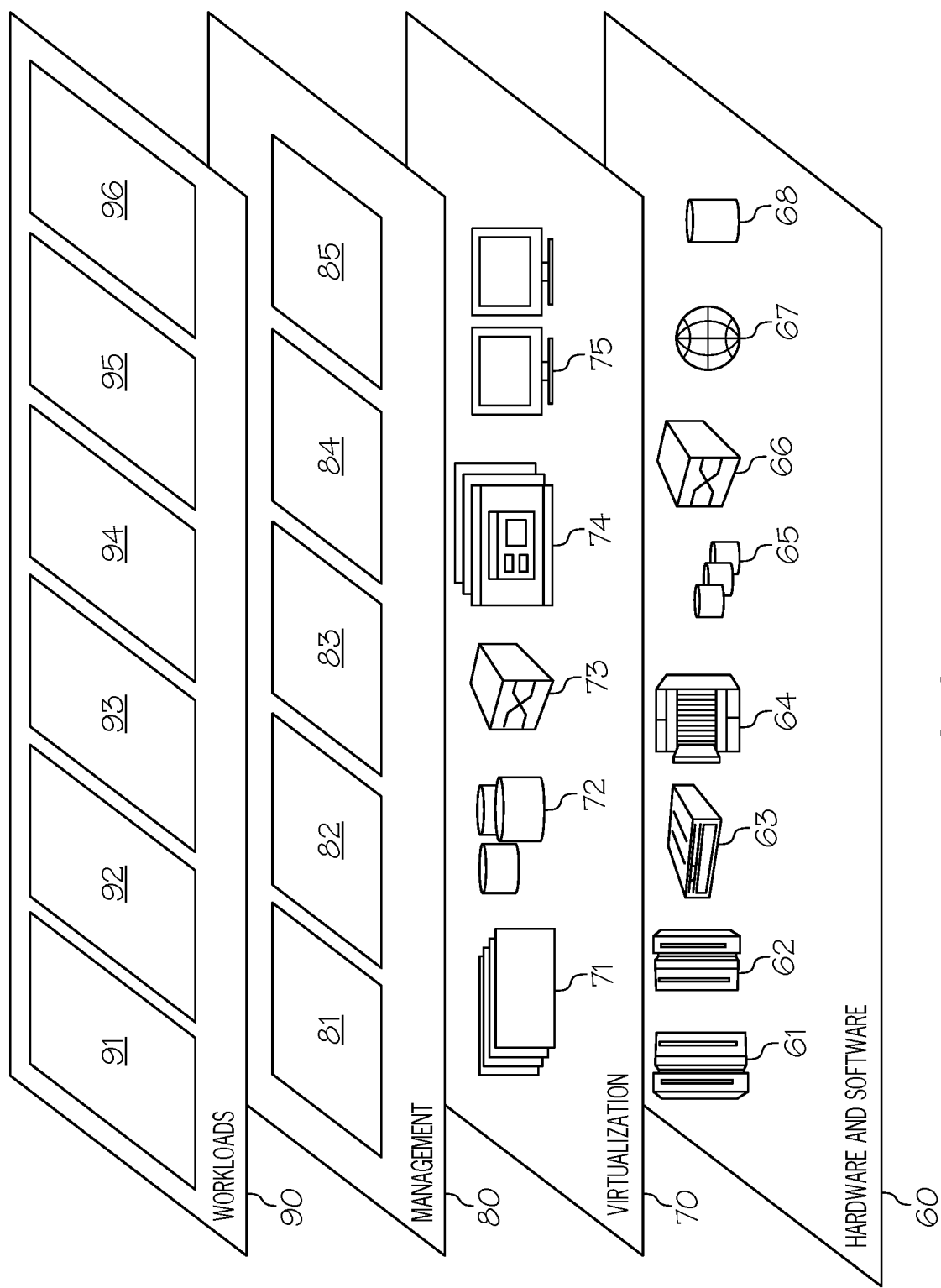
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and query training processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by one or more processors, a question, wherein the question comprises a set of tokens T (T1, T2, . . . , Tn);
   selecting, by one or more processors, tokens T' (T'1, T'2, . . . , T'm) from the tokens T (T1, T2, . . . , Tn), wherein each T'j from T' is a noun;
   classifying, by one or more processors, the each T'j as a noun type;
   scanning, by one or more processors, a corpus to identify passages with candidate answers to the question;
   analyzing, by one or more processors, the identified passages utilizing noun entries in the passages classified as the noun type;
   training, by one or more processors, an artificial intelligence (AI) system to associate a relevancy to the question for the identified passages based on noun types, wherein the noun types are from a group of noun types that include a physical state descriptor, a structure descriptor, and a time descriptor;
   utilizing, by one or more processors, the trained AI system to associate the relevancy to the question for the identified passages; and
   providing, by one or more processors, an answer to the question based on an output of the trained AI system.

2. The method of claim 1, further comprising:
   training, by one or more processors, the AI system to learn which of the noun types are most predictive and which of the noun types are least predictive for associating the relevancy to the question for the identified passages from the corpus.

3. The method of claim 1, wherein at least one of the set of tokens T is a word.

4. The method of claim 1, wherein at least one of the set of tokens T is a phrase.

5. The method of claim 1, further comprising:
utilizing, by one or more processors, the answer to the question to automatically control a physical device.

6. The method of claim 1, wherein the trained AI system is a trained deep neural network (DNN).

7. The method of claim 5, wherein the physical device is a unit of manufacturing equipment.

8. A computer program product for determining relevancy of answers to questions based on entity relevance in a system capable of answering questions, the computer program product comprising a computer readable storage medium having program code embodied therewith, wherein the computer readable storage medium is not a transitory signal per se, and wherein the program code is readable and executable by a processor to perform a method comprising:
receiving a question, wherein the question comprises a set of tokens T (T1, T2, . . . , Tn);
selecting tokens T' (T'1, T'2, . . . , T'm) from the tokens T (T1, T2, . . . , Tn), wherein each T'j from T' is a noun;
classifying the each T'j as a noun type;
scanning a corpus to identify passages with candidate answers to the question;
analyzing the identified passages utilizing noun entries in the passages classified as the noun type;
training an artificial intelligence (AI) system to associate a relevancy to the question for the identified passages based on noun types, wherein the noun types are from a group of noun types that include a physical state descriptor, a structure descriptor, and a time descriptor;
utilizing the trained AI system to associate the relevancy to the question for the identified passages; and
providing an answer to the question based on an output of the trained AI system.

9. The computer program product of claim 8, wherein the method further comprises:
training the AI system to learn which of the noun types are most predictive and which of the noun types are least predictive for associating the relevancy to the question for the identified passages from the corpus.

10. The computer program product of claim 8, wherein at least one of the set of tokens T is a word.

11. The computer program product of claim 8, wherein at least one of the set of tokens T is a phrase.

12. The computer program product of claim 8, wherein the method further comprises:
utilizing the answer to the question to automatically control a physical device.

13. The computer program product of claim 8, wherein the trained AI system is a trained deep neural network (DNN).

14. The computer program product of claim 8, wherein the program code is provided as a service in a cloud environment.

15. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
receiving a question, wherein the question comprises a set of tokens T (T1, T2, . . . , Tn);
selecting tokens T' (T'1, T'2, . . . , T'm) from the tokens T (T1, T2, . . . , Tn), wherein each T'j from T' is a noun;
classifying the each T'j as a noun type;
scanning a corpus to identify passages with candidate answers to the question;
analyzing the identified passages utilizing noun entries in the passages classified as the noun type;
training an artificial intelligence (AI) system to associate a relevancy to the question for the identified passages based on noun types, wherein the noun types are from a group of noun types that include a physical state descriptor, a structure descriptor, and a time descriptor;
utilizing the trained AI system to associate the relevancy to the question for the identified passages; and
providing an answer to the question based on an output of the trained AI system.

16. The computer system of claim 15, wherein the method further comprises:
training the AI system to learn which of the noun types are most predictive and which of the noun types are least predictive for associating the relevancy to the question for the identified passages from the corpus.

17. The computer system of claim 15, wherein at least one of the set of tokens T is a word.

18. The computer system of claim 15, wherein the method further comprises:
utilizing the answer to the question to automatically control a physical device.

19. The computer system of claim 15, wherein the stored program instructions are provided as a service in a cloud environment.

* * * * *